United States Patent [19]

Weed

[11] 4,215,742

[45] Aug. 5, 1980

[54] EXHAUST COOLERS

[76] Inventor: Lauren R. Weed, Jamestown, N.Y.

[73] Assignee: Blackstone Corporation, Jamestown, N.Y.

[21] Appl. No.: 905,860

[22] Filed: May 15, 1978

[51] Int. Cl.³ .............................................. F01P 3/00
[52] U.S. Cl. .................................... 165/51; 165/165; 123/41.08
[58] Field of Search ................ 165/51, 154, 165, 164; 60/310, 320, 321; 123/41.08

[56] References Cited
U.S. PATENT DOCUMENTS

| 1,148,605 | 8/1915 | McHugh | 165/140 |
| 1,965,133 | 7/1934 | Pieper | 165/164 |
| 2,627,283 | 2/1953 | Przyborowski | 165/165 |
| 2,977,940 | 4/1961 | Theriault | 123/25 |
| 3,399,720 | 9/1968 | Doelz et al. | 165/166 |

Primary Examiner—Albert W. Davis
Assistant Examiner—Margaret A. Focarino
Attorney, Agent, or Firm—Buell, Blenko & Ziesenheim

[57] ABSTRACT

An exhaust gas cooler for internal combustion engines of land based vehicles is provided having an outer elongate housing and a pair of spaced inner housings forming within them exhaust gas passages and with coolant passages between the walls of the inner and outer housings carrying coolant around the inner housings. Said housings are formed of sheet metal and interconnected along their edges with a metallurgical bond.

10 Claims, 11 Drawing Figures

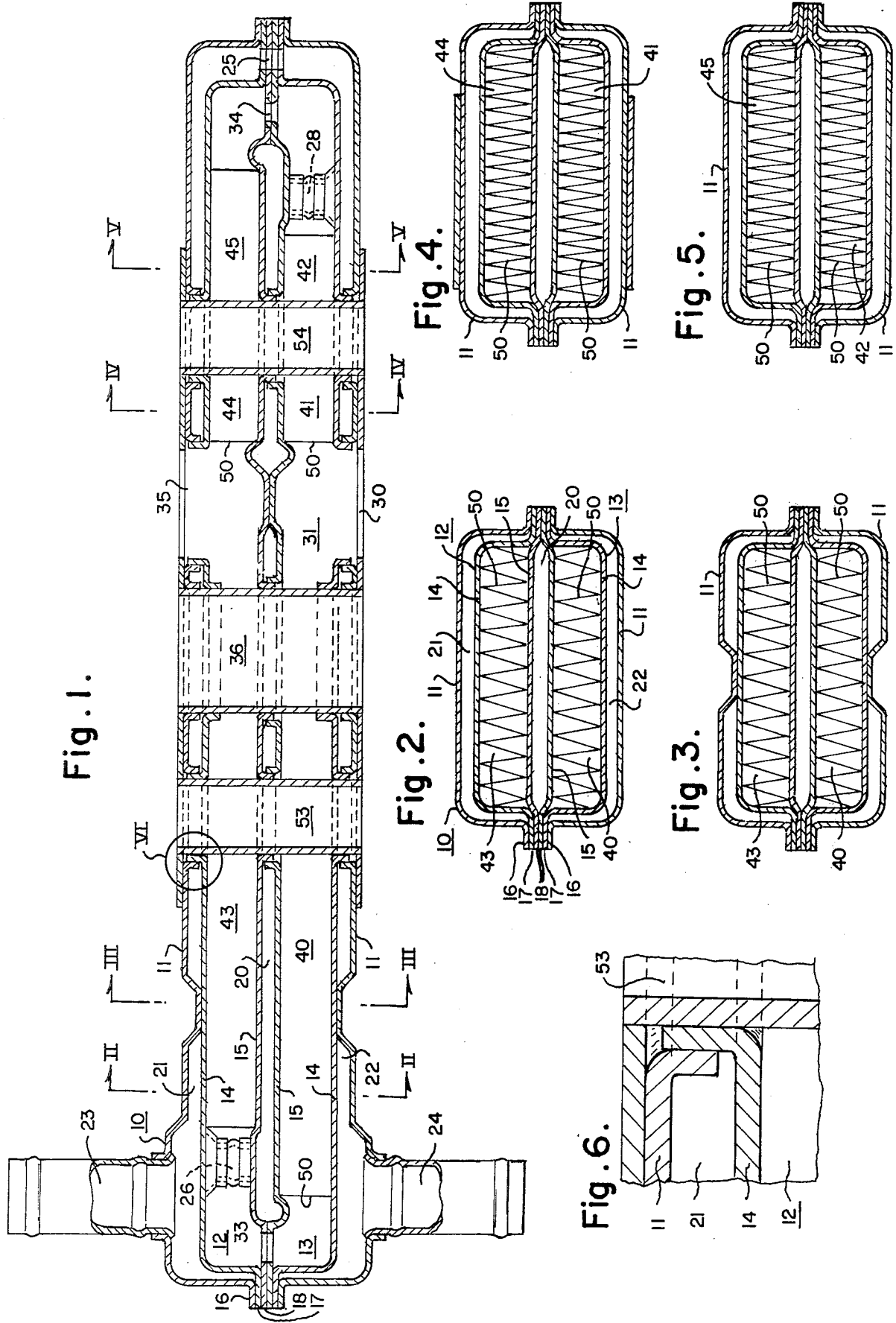

EXHAUST COOLERS

This invention relates to exhaust coolers and particularly to exhaust coolers for automotive vehicles.

The cooling of exhaust gases in marine engines is a common practice. For example, Wattean U.S. Pat. No. 3,324,533, Pace U.S. Pat. No. 3,696,620, Plank et al. U.S. Pat. No. 3,802,491, Kashmerick U.S. Pat. No. 3,921,398 and Hackbarth et al. U.S. Pat. No. 3,946,697 all describe water cooling apparatus for cooling marine engine exhaust systems.

The cooling of exhaust gases on motor vehicles for land operation is quite another matter. Cooling of exhaust fumes or gases in motor vehicles for land operation has been proposed prior to this invention, however, such coolers have been expensive and have met with little success. For example, Smith U.S. Pat. No. 1,634,000, Putnam U.S. Pat. No. 1,858,458, Moorhouse U.S. Pat. No. 1,878,165, Vincent U.S. Pat. No. 1,936,698, Reske U.S. Pat. No. 2,858,667, Benjamin U.S. Pat. No. 3,169,365 and Grossean U.S. Pat. No. 3,884,194 all describe systems for removing heat from exhaust gases by various means. However, there has, prior to the present invention, been no practical exhaust cooler for use in motor vehicles for land operation.

An exhaust cooler for use in motor vehicles for land operation must be relatively small in size and highly efficient so that it can operate from the vehicle cooling system without placing undue demands on the radiator or heat exchanger used in such system. In must, in addition, be relatively simple and relatively inexpensive.

The present invention provides an exhaust cooler, especially designed for motor vehicles for land operation, which does satisfy all of these requirements. It is relatively simple and inexpensive and does provide cooling of exhaust gases without critical overloading of the coolant system.

The present invention provides an elongate outer housing, a pair of spaced generally parallel inner housings extending lengthwise of the outer housing and spaced therefrom to form a pair of interconnected generally parallel exhaust gas passages within said inner housings and generally parallel and interconnected coolant passages generally surrounding at least a part of said inner passages, multiple heat transfer means in at least a part of said inner housings contacting the housing walls, coolant inlet means into at least two of said coolant passages, coolant exhaust means from at least two of said coolant passages including the passage not connected to the inlet means, an exhaust gas inlet connected to one of said two exhaust gas passages and an exhaust gas outlet connected to the other of said two exhaust passages. Preferably the coolant inlet and outlet passages are at one end of said outer housing on opposite sides thereof. The exhaust gas inlet and outlet are preferably intermediate the ends of the cooler. The exhaust gas outlet preferably goes to a gas valve which controls the flow of exhaust gas through the cooler. Preferably the walls of said inner and outer housings are formed of sheet metal of generally U-shaped configuration but of different lengths of legs for the U and with flanges transverse to the ends of the legs of the U which are pressed together and metallurgically bonded along a common edge. The metallurgical bonding may be brazing, welding or like process in which the several elements are at least partially fused or otherwise metallurgically bonded to create a joint capable of resisting temperatures and pressures encountered in the coolant and exhaust gas. Openings are preferably provided for fastening means for attaching the cooler to an exhaust manifold of an internal combustion engine.

In the foregoing general description of this invention certain objects, purposes and advantages have been set out. Other objects, purposes and advantages of this invention will be apparent from a consideration of the following description and the accompanying drawings in which:

FIG. 1 is a horizontal section through an exhaust gas cooler according to this invention;

FIG. 2 is a section on line II—II of FIG. 1;

FIG. 3 is a section on the line III—III of FIG. 1;

FIG. 4 is a section on the line IV—IV of FIG. 1;

FIG. 5 is a section on the line V—V of FIG. 1;

FIG. 6 is an enlarged fragmentary section of the joint within circle VI of FIG. 1;

Figures 7, 8, 9, 10, 11:
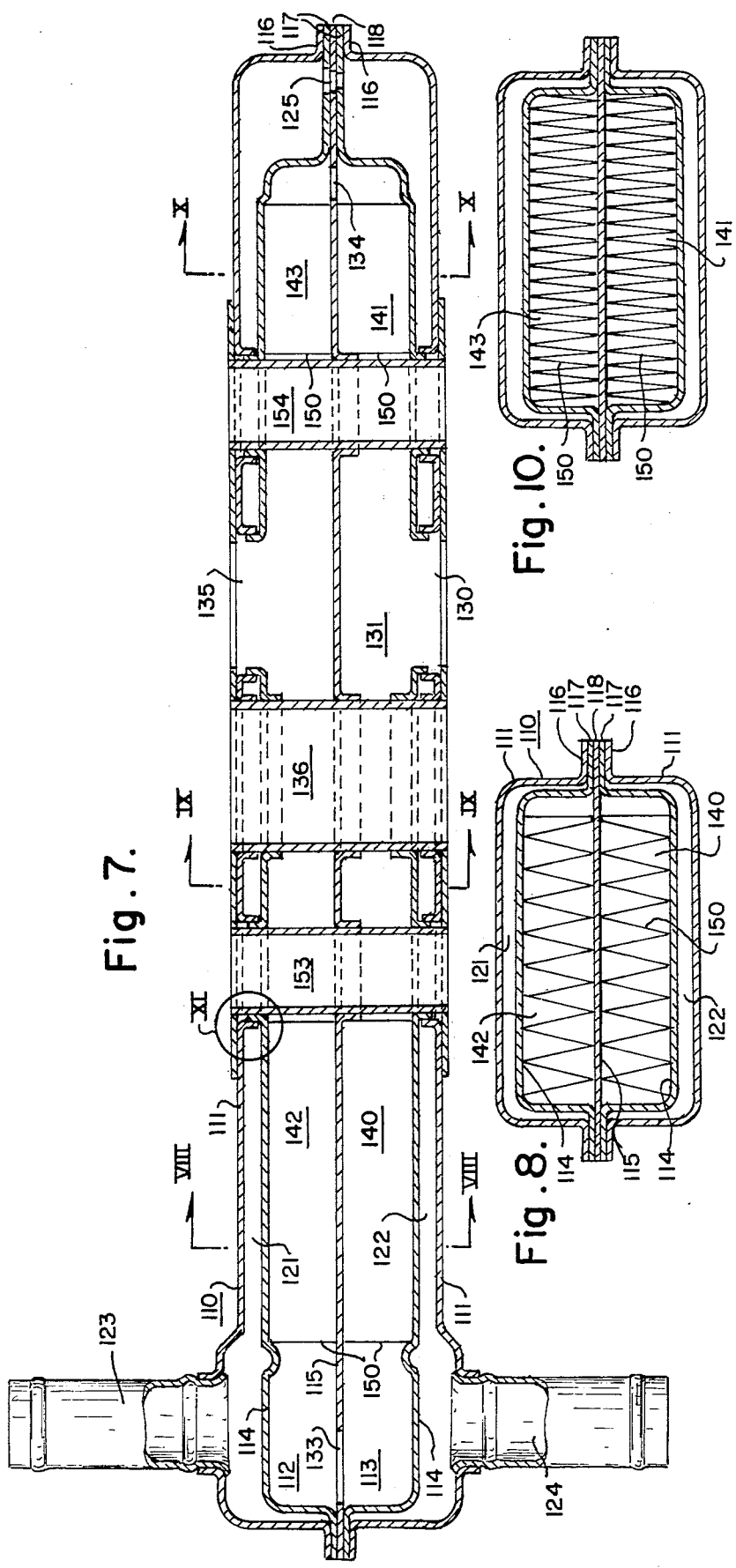
FIG. 7 is a horizontal section through a second embodiment of an exhaust gas cooler according to this invention.
FIG. 8 is a section on the line VIII—VIII of FIG. 7.
FIG. 9 is a section on the line IX—IX of FIG. 7.
FIG. 10 is a section on the line X—X of FIG. 7.
FIG. 11 is an enlarged fragmentary section of the joint within circle XI of FIG. 7.

Referring to the drawings there is illustrated an exhaust gas cooler 10 for internal combustion engine used in an automobile. The cooler is made up of an outer housing 10 consisting of two outer elongate U-shaped shells 11 of metal, and two spaced inner housings 12 and 13 each formed of outer 14 and inner 15 elongate U-shaped shells of metal of different lengths on the legs, all of shells 11, 14 and 15 have peripheral flanges 16, 17 and 18 which fit together and are welded or otherwise metallurgically bonded together to form a peripheral seal. The inner shells 15 of inner housings 12 and 13 are spaced apart and generally parallel forming an elongate passageway 20 between them. The two inner housings 12 and 13 are spaced from the shells 11 forming the outer housing so as to form elongate passages 21 and 22. A coolant inlet 23 is provided in one end of one side of housing 10 for delivering coolant to passage 21 and a coolant outlet 24 is provided on the opposite side of housing communicating with passage 22 for exhausting coolant from housing 10. The passages 21 and 22 are connected by passage 25 at the other end of housing 10. A passage 26 generally aligned with inlet 23 communicates through inner housing 12 to passage 20 to carry coolant from inlet 23 into passage 20. A similar passage 28 at the opposite end of passage 20 communicates through inner housing 13 into passage 22 to deliver coolant from passage 20 into passage 22 for delivery to outlet 24. An exhaust gas inlet opening 30 is provided in one wall 11 of outer housing and connects with passage 31 into inner housing 13 intermediate the length of housings 10 and 13. Exhaust gases entering housing 13 are divided, part going to each end where passages 33 and 34 connect inner housing 13 with inner housing 12. An exhaust gas outlet 35 is provided directly opposite inlet 30. An exhaust gas return passage 36 may be provided through the entire assembly depending upon the manner of assembly. Preferably a gas control valve (not shown) is connected to outlet 35 at one side and to return passage 36 on the other so that exhaust gas may go into the cooler and be returned back through passage or it may be by-passed directly to the exhaust system.

Each of the inner housings 12 and 13 is divided effectively into three heat transfer chambers 40, 41, 42 and 43, 44, 45 each of which is broken up by heat transfer vanes 50 of conductive metal. Passages 53 and 54 are provided through all housings at spaced apart points intermediate their ends for the passage of mounting bolts.

The operation of the cooler of this invention is believed to be understandable from the foregoing description of drawings. Briefly, however, coolant liquid from the automobile cooler system or the like is introduced into coolant inlet 23 where part goes through passage 21 and part through passage 20. Both passages 20 and 21 deliver their fluid to passage 22 at the opposite end of the cooler and the combined coolant is emptied through outlet 24. As can be seen from FIGS. 2-5 the coolant thus effectively surrounds the inner housings 12 and 13. Exhaust gas from the automobile engine is delivered to inlet opening 30 where it enters inner housing 13 through passage 31 and is divided, part going each direction toward opposite ends of housing 13 through the heat transfer vanes 50 which extract heat and deliver it to the walls of housing 13 where the coolant in passages 20 and 21 removes it. The gases then go to inner housing 12 where the heat transfer action takes place after which the cooled gases go to outlet 35 where they go to a gas valve, then back through return passage 26 to the automobile exhaust system.

The exhaust gas cooler illustrated in FIGS. 7-11 is similar to that of FIGS. 1 through 6 except the central cooling channel is omitted. In this embodiment the cooler is made up of an outer housing 110 consisting of two outer elongate U shaped shells 111 of metal, and two inner housings 112 and 113 each formed of outer 114 elongate U-shaped shells of metal and a common divider strip 115 of metal, all of shells 111, 114 and divider strip 115 having peripheral flanges 116, 117 and 118 which fit together and are welded or otherwise metallurgically bonded together to form a peripheral seal. The two inner housings 112 and 113 are spaced from shells 111 forming the outer housing so as to form elongate passages 121 and 122. A coolant inlet 123 is provided in one end of one side of housing 110 for delivering coolant to passage 121 and a coolant outlet 124 is provided on the opposite side of housing 110 communicating with passage 122 for exhausting coolant from housing 110. Passages 121 and 122 are connected by passage 125 through flanges 117 and 118 of shells 114 and divider strip 115. An exhaust gas inlet opening 130 is provided in one wall 111 of outer housing 110 and connects with passage 131 into inner housing 113 intermediate the length of housings 110 and 113. Exhaust gases entering housing 113 are divided, part going to each end where passages 133 and 134 connect inner passages 113 with inner passage 112. An exhaust gas outlet 135 is provided directly opposite inlet 130. An exhaust gas return passage 136 may be provided through the entire assembly as illustrated, depending upon the manner of use. Preferably a gas control valve (not shown) is connected to outlet 135 at one side and return passage 136 at the other so that exhaust gas may go into and through the cooler and be returned back through passage 136 or it may be by-passed directly to the exhaust system.

Each of the inner housings 112 and 113 is divided effectively into two major heat transfer chambers 140, 141, 142 and 143, each of which is in turn broken up by heat transfer vanes 150 of conductive metal.

Passages 153 and 154 are provided through the entire assembly at spaced apart points intermediate their ends for the passage of mounting bolts.

The operation of this cooler is basically the same as that of FIGS. 1-6 except for the omission of the central coolant passage.

In the foregoing specification certain presently preferred embodiments and practices of this invention have been set out, however, it will be understood that this invention may be otherwise embodied within the scope of the following claims.

I claim:

1. An exhaust gas cooler for motor vehicles for land operation capable of cooling the entire exhaust gas output comprising an elongate outer housing, a pair of spaced apart generally parallel inner housings extending lengthwise of the outer housing and interconnected at their ends, said inner housings being spaced from the outer housing to form a pair of interconnected generally parallel exhaust gas passages within said outer housing, at least two generally parallel and interconnected coolant passages formed by and between the walls of said inner and outer housings and substantially surrounding said inner housings, multiple heat transfer means in at least a part of each of said inner housings contacting the walls thereof, an intermediate coolant passage between said exhaust gas passages, coolant inlet means into at least two of said coolant passages including said intermediate coolant passage adjacent one end thereof, coolant exhaust means communicating with at least two of said coolant passages including any passage not connected to the inlet means, said coolant exhaust means including a connection between said intermediate coolant passage and said any passage not connected to the inlet means at the other end remote from the inlet means, an exhaust gas inlet connected to one of said two exhaust gas passages and an exhaust gas outlet connected to the other of said exhaust gas passages.

2. An exhaust gas cooler as claimed in claim 1 wherein the exhaust gas inlet and outlet are intermediate the length of the cooler and exhaust gases entering the inlet are divided into said inner housings.

3. An exhaust gas cooler as claimed in claim 1 wherein the exhaust gas passages are provided with a plurality of spaced chambers containing said heat transfer means.

4. An exhaust gas cooler as claimed in claim 1 wherein the walls of said inner and outer housings are formed of metal of generally U-shaped configuration but with different lengths of legs and having interfitting transverse flanges at the ends of each of the legs metallurgically bonded together.

5. An exhaust gas cooler as claimed in claim 4 wherein the flanges are welded together.

6. An exhaust gas cooler as claimed in claim 4 wherein the flanges are brazed together.

7. An exhaust gas cooler as claimed in claim 1 wherein the heat transfer means are a plurality of thin metal vanes extending transversely from wall to wall of the inner housings.

8. An exhaust gas cooler as claimed in claim 7 wherein the vanes form a plurality of small parallel elongate passages.

9. An exhaust gas cooler as claimed in claim 1 wherein three generally parallel and interconnected coolant passages are provided whereby coolant contacts substantially all surface areas of the inner housings.

10. An exhaust gas cooler as claimed in claim 1 having two generally parallel and interconnected coolant passages.

* * * * *

UNITED STATES PATENT AND TRADEMARK OFFICE
CERTIFICATE OF CORRECTION

PATENT NO. : 4,215,742
DATED : August 5, 1980
INVENTOR(S) : LAUREN R. WEED

It is certified that error appears in the above-identified patent and that said Letters Patent are hereby corrected as shown below:

Column 3, line 24, after "20" insert --,22--.

Column 3, line 27, before "return" add --a--.

Column 3, line 28, cancel "26".

Signed and Sealed this

Seventeenth Day of November 1981

[SEAL]

Attest:

Attesting Officer

GERALD J. MOSSINGHOFF

Commissioner of Patents and Trademarks